Patented Nov. 18, 1924.

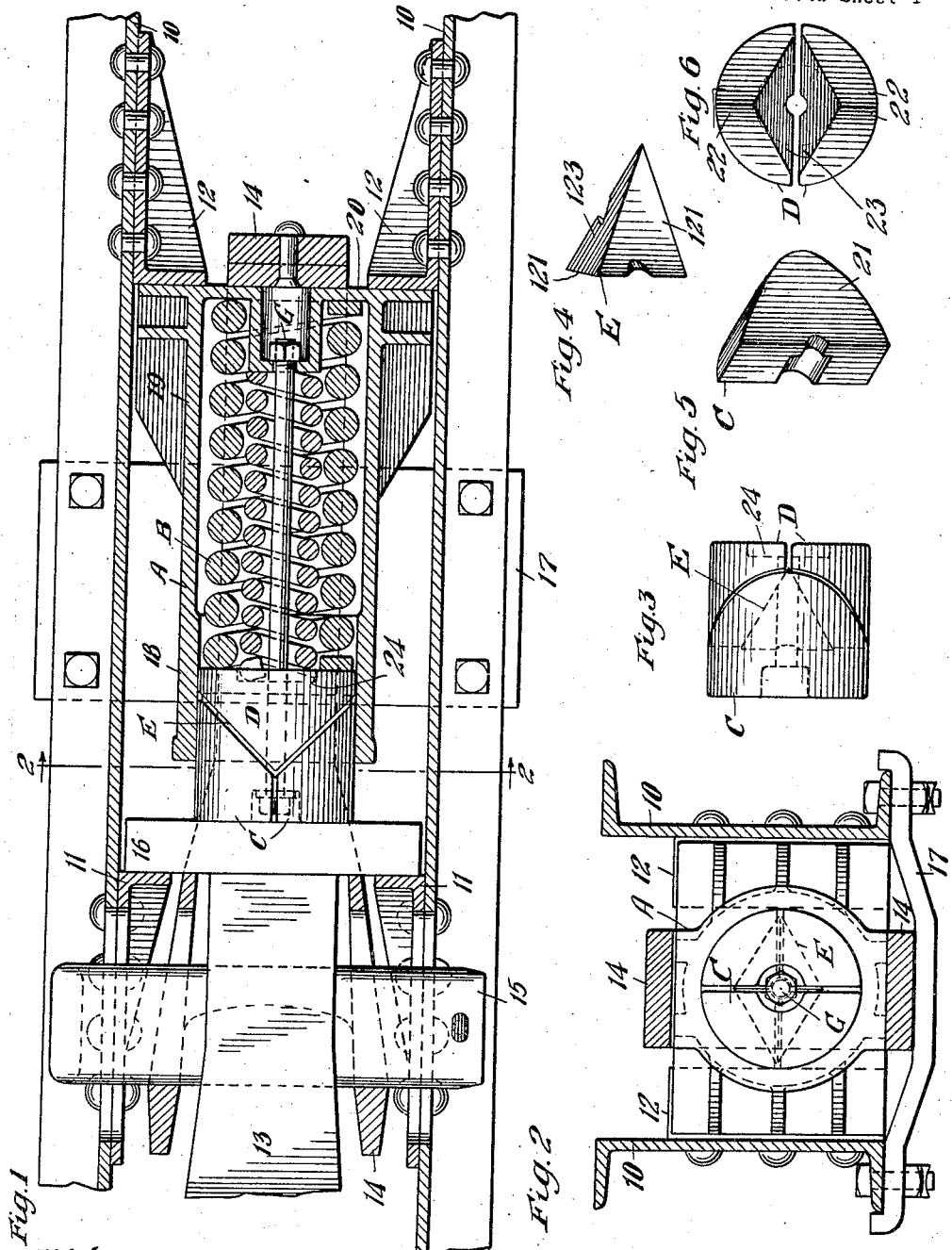

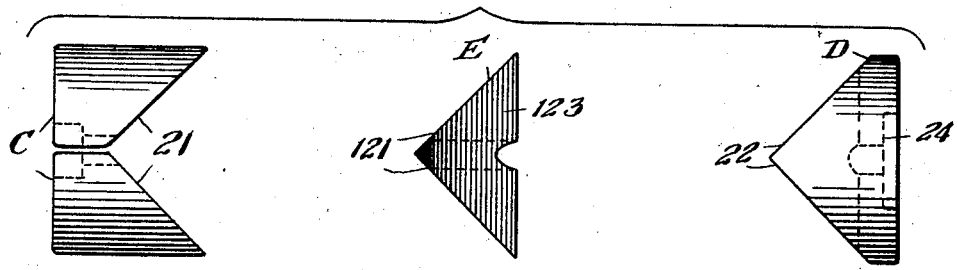
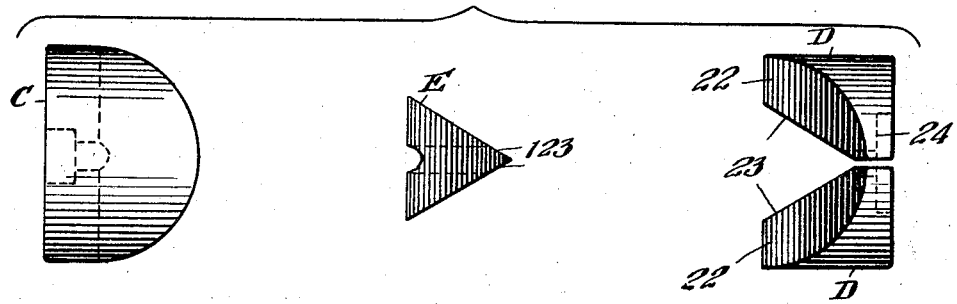

1,515,610

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 1, 1920, Serial No. 421,167. Renewed September 23, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

Objects of the invention are to provide a friction shock absorbing mechanism especially adapted for railway draft riggings and wherein is obtained high capacity combined with certain release; an unusually compact arrangement of movable friction elements; and friction elements of such construction that the same may be easily and accurately manufactured at relatively small expense.

In the drawings forming a part of this specification, Figure 1 is a horizontal, longitudinal, sectional view of a portion of a railway draft rigging showing my improvements in connection therewith. Figure 2 is a vertical, transverse, sectional view corresponding substantially to the line 2—2 of Figure 1. Figure 3 is an elevational view of the movable friction elements, the elevational view of Figure 3 being at 90° to the showing of said friction elements in Figure 1. Figure 4 is a perspective view of the wedge employed in my construction. Figure 5 is a perspective of one of the front or outer friction shoes employed in my construction. Figure 6 is an end view of the two inner friction shoes, the view being taken in a direction from the outer end of the mechanism toward the inner or rear end thereof. Figure 7 is a group view of all of the movable friction elements, the same being shown longitudinally separated but in their respective positions in correspondence with the illustration found in Figure 1 of the same elements assembled. And Figure 8 is a view similar to Figure 7 but taken at 90° or at right angles thereto.

In said drawings, 10—10 denote channel center or draft sills of a railway car to the inner faces of which are secured front stop lugs 11 and rear stop lugs 12. A portion of a drawbar is indicated at 13, the same being operatively associated with the shock absorbing mechanism proper, by means of a hooded cast yoke 14 and coupler key 15 arranged in a well known manner. The friction shock absorbing mechanism proper, hereinafter described, and a front follower 16, are disposed within the yoke 14. The yoke and movable parts sustained thereby are held in proper position by a detachable saddle plate 17.

The improved shock absorbing mechanism proper, as shown, comprises, broadly, a combined friction shell and spring cage casting A; a spring resistance B; a pair of outer friction shoes C—C; a pair of inner friction shoes D—D; a wedge E; and a retainer bolt G.

The casting A is formed with the friction shell proper 18 at the forward end thereof, said shell being of well known cylindrical form. The spring cage 19 constitutes the rear or inner portion of the casting A and it also is of generally cylindrical form in order to act as a centering device for the coil spring B. At its rear end, the casting A has an integral transverse wall 20 laterally extended so as to adapt the same to act as the rear follower of the mechanism. The retainer bolt G is connected at its rear end to the rear wall 20 and extends forwardly through the spring and through suitable openings or notches formed in the elements C, D, and E, the forward end of the bolt engaging the two front friction shoes C so as to hold all of the parts in assembled relation and maintain the spring under initial compression in a well known manner, when the latter is desired.

The two friction shoes C—C are preferably of like construction and each is of substantially semi-cylindrical form at its outer end as best indicated in Figure 2, it being understood that said ends engage the front follower 16 and are therefore adapted to receive the actuating pressure directly. Each of said shoes C is beveled at its inner end so as to provide a wedge face 21, the wedge faces 21 of the two shoes diverging rearwardly as clearly indicated in Figure 7. Said faces 21 will preferably extend at a comparatively blunt angle with respect to the axis of the shell and, as shown, have an included angle of 90°.

The two inner shoes D—D are also preferably of like construction and each is of substantially semi-cylindrical form at its inner end as best indicated in Figure 6. Each of said shoes D is formed at its front side with beveled faces 22—22 arranged at an angle corresponding to the included angle between the wedge faces 21 of the front shoes C. In actual practice, the faces 22—22 will be normally slightly separated from the wedge faces 21 of the shoes C, as clearly indicated in Figure 1. In addition, each shoe D is formed on its front side with a wedge face 23 as shown clearly in Figure 8. The wedge faces 23 are arranged at a relatively acute angle with respect to the axis of the shell and, as shown, have an included angle therebetween of 60°, as will appear from an inspection of Figure 8. Each of said shoes D may also be formed with a partial seat 24 to receive the front end of the inner coil of the spring unit B.

The wedge member E is a four-sided element and has thereon front wedge faces 121—121 that diverge rearwardly or inwardly of the friction shell, said wedge faces 121 being arranged at the same angle as the wedge faces 21 of the shoes C with which they are adapted to directly cooperate. On its rear side, the wedge member E is formed with another pair of wedge faces 123—123 having an included angle therebetween corresponding to the included angle between the wedge faces 23 of the shoes D, it being understood that said wedge faces 123 engage and cooperate with the wedge faces 23.

As will be seen from an inspection of the drawings, the wedge faces 21 and 121 are in planes angularly offset 90° with respect to the planes of the other wedge faces 23 and 123. With this construction, it is evident that the front friction shoes C—C are spread apart in lines at right angles to the spreading lines of the inner friction shoes D. With this construction, the wedge member E becomes substantially completely enveloped within the four shoes C—C and D—D and I am enabled to obtain a very compact construction and at the same time employ both blunt and keen wedging angles so as to obtain high capacity under compression and certain release. It will also be noted that all of the wedge faces 21, 121, 23 and 123 are flat or plane surfaces and so arranged that the same may be readily trued without difficulty after the respective elements have been manufactured in the form of castings.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having interior friction surfaces; of a spring resistance; and a friction unit cooperable with said shell and spring resistance, said unit comprising, an outer set of friction shoes, an inner set of friction shoes, and a single wedge interposed between and cooperable with both sets of friction shoes, the outer set of friction shoes and wedge having cooperable sets of wedge faces arranged at one angle and the inner set of friction shoes and the wedge having cooperable sets of wedge faces arranged at a different angle, with respect to the axis of the shell.

2. In a friction shock absorbing mechanism, the combination with a friction shell having interior friction surfaces; of a spring resistance; and a friction unit cooperable with said shell and spring resistance, said unit comprising, an outer set of friction shoes, an inner set of friction shoes, and a single wedge interposed between and cooperable with both sets of friction shoes, said outer set of friction shoes and wedge having cooperable wedge faces diverging at one angle inwardly of the shell and the inner set of shoes and wedge having cooperable wedge faces diverging at a different angle outwardly of the shell, the first named set of wedge faces being angularly offset with respect to the second named set of wedge faces.

3. In a friction shock absorbing mechanism, the combination with a friction shell having interior friction surfaces; of a spring resistance; and a friction unit cooperable with said shell and spring resistance, said unit comprising, an outer set of friction shoes, an inner set of friction shoes, and a single wedge interposed between and cooperable with both sets of friction shoes, said wedge and sets of shoes having cooperable sets of wedge faces, said wedge faces being so disposed that a transverse plane would intersect all of them, the inner ends of the outer set of shoes alternating with and longitudinally overlapping the outer ends of the inner set of shoes, the wedge being substantially completely enclosed within the shoes.

4. In a friction shock absorbing mechanism, the combination with a friction shell having interior friction surfaces; of a spring resistance; and a friction unit cooperable with said shell and spring resistance, said unit comprising, an outer set of friction shoes, an inner set of friction shoes, and a single wedge interposed between and cooperable with both sets of friction shoes, each set of shoes consisting of a pair, the outer pair of shoes and the wedge having cooperable wedge faces diverging inwardly of the shell and the inner pair of shoes and the wedge having cooperable wedge faces diverging outwardly of the shell, one set of said wedge faces being angularly offset substantially 90° with respect to the other set.

5. In a friction shock absorbing mechanism, the combination with a friction shell having interior friction surfaces; of a spring resistance; and a friction unit cooperable with said shell and spring resistance, said unit comprising, an outer set of friction shoes, an inner set of friction shoes, and a single wedge interposed between and cooperable with both sets of friction shoes, each set of shoes consisting of a pair, the outer pair of shoes and the wedge having cooperable wedge faces diverging inwardly of the shell and the inner pair of shoes and the wedge having cooperable wedge faces diverging outwardly of the shell, one set of said wedge faces being angularly offset, substantially 90° with respect to the other set, one set of said wedge faces having an included angle appreciably greater than the included angle of the other set.

6. In a friction shock absorbing mechanism, the combination with a friction shell having an interior cylindrical friction surface; of an outer pair of friction shoes cooperable with said shell, said shoes having wedge faces at their inner ends diverging inwardly of the shell and having a relatively blunt-angle included therebetween; an inner set of friction shoes cooperable with the shell and having wedge faces on the forward sides thereof diverging outwardly of the shell, the included angle therebetween being appreciably less than the included angle of the wedge faces of the outer shoes; a wedge interposed between the two sets of shoes, said wedge having four wedge faces arranged to cooperate with the said wedge faces of the two sets of shoes; and a spring adapted to afford a yielding resistance to relative movement between the friction elements and the shell.

7. In a friction shock absorbing mechanism, the combination with a friction shell having interior friction surfaces; of a spring resistance; and a friction unit cooperable with said shell and spring resistance, said unit comprising an outer set of friction shoes having inwardly diverging wedge faces, an inner set of friction shoes embraced by said diverging wedge faces, and a single wedge interposed between and cooperable with both sets of friction shoes, said wedge having a plurality of wedge faces, certain of which co-act with the inner set of shoes, and the remaining faces of which co-act with the wedge faces of the outer set of shoes, the wedge being substantially completely enclosed within said shoes.

8. In a friction shock absorbing mechanism, the combination with a friction shell having interior friction surfaces; of a spring resistance; an inner set of friction shoes; an outer set of friction shoes; and a single wedge interposed between and cooperable with both said sets of friction shoes, said wedge having one set of wedge faces diverging inwardly of the shell and another set diverging outwardly of the shell, said sets of wedge faces being longitudinally overlapped and alternated circumferentially of the wedge.

9. In a friction shock absorbing mechanism, the combination with a friction shell having interior friction surfaces; of a spring resistance; an inner set of friction shoes; an outer set of friction shoes; and a single wedge interposed between and cooperable with both said sets of friction shoes, said wedge having one set of wedge faces diverging inwardly of the shell and another set diverging outwardly of the shell, said sets of wedge faces being longitudinally overlapped and alternated circumferentially of the wedge, one of said sets of wedge faces extending at a different angle with respect to the axis of the shell than the other set.

In witness that I claim the foregoing I have hereunto subscribed my name this 19th day of Oct. 1920.

JOHN F. O'CONNOR.

Witness:
CARRIE GAILING.